(No Model.)
E. J. GRIFFIN.
HEDGE FENCE STAY.
No. 488,498. Patented Dec. 20, 1892.
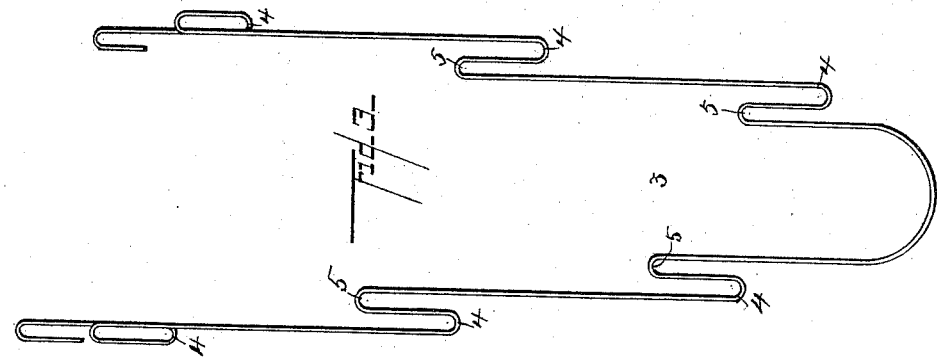
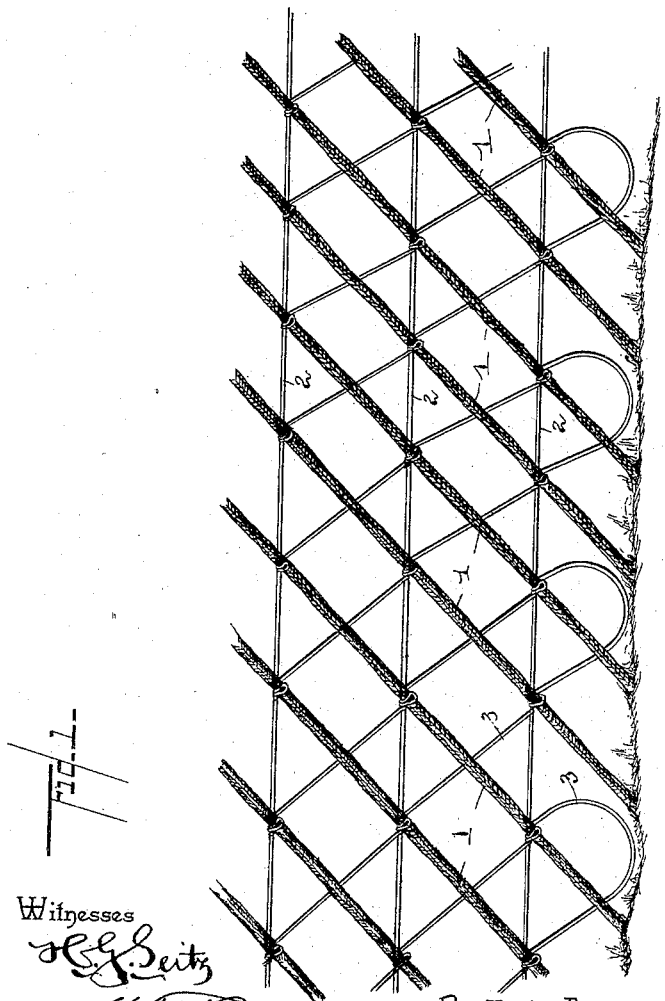
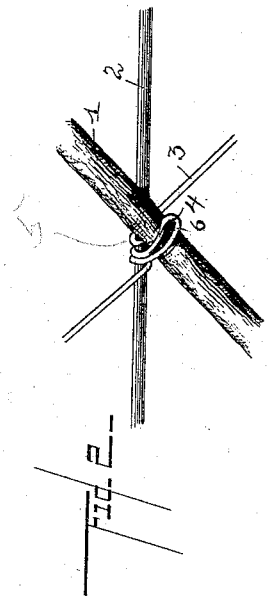
Witnesses
Inventor
Edwin J. Griffin,
By his Attorneys,

UNITED STATES PATENT OFFICE.

EDWIN J. GRIFFIN, OF ZION, KENTUCKY.

HEDGE-FENCE STAY.

SPECIFICATION forming part of Letters Patent No. 488,498, dated December 20, 1892.

Application filed April 15, 1891. Serial No. 389,044. (No model.)

*To all whom it may concern:*

Be it known that I, EDWIN J. GRIFFIN, a citizen of the United States, residing at Zion, in the county of Henderson and State of Kentucky, have invented a new and useful Hedge-Fence Stay, of which the following is a specification.

The invention relates to improvements in hedge-fences.

The object of the present invention is to simplify and improve the construction of hedge fences and especially the manner of securing the bracing wires to the horizontal wires.

A further object of the invention is to enable hedge fences to be readily and efficiently repaired by the application of my invention.

The invention consists in the construction and novel combination and arrangement of parts hereinafter fully described illustrated in the accompanying drawings and pointed out in the claim hereto appended.

In the drawings:—Figure 1 is a side elevation of a hedge fence embodying the invention. Fig. 2 is a detail perspective view illustrating the manner of securing a wire tie to a horizontal wire. Fig. 3 is a detail view of one of the wire ties.

Referring to the accompanying drawings, 1 designates the inclined stalks of a hedge fence along which horizontal wires 2 extend, and the latter, which are preferably three in number, are braced by wire ties 3, which are arranged obliquely in a direction opposite that of the stalks but which may, if desired, be otherwise arranged. The wire tie 3 is doubled to form a pair of braces each of which are bent at intervals to form depending U-shaped loops 4, and the latter, form between them and the adjacent portion of the wire tie, crotchets 5 which receives the horizontal wires. The horizontal wires are secured in the crotches 5 by bending the depending U-shaped loops and twisting the same upon them as illustrated in Fig. 2 of the accompanying drawings. The U-shaped loops after being twisted around the horizontal wires, are extended and formed into hook extensions 6 which engage the inclined stalks and secure the same to the horizontal wires.

It will be seen that the manner of securing the wire ties to the horizontal wires, is simple and inexpensive and that a hedge fence may be conveniently and strongly erected and readily repaired.

From the foregoing description and the accompanying drawings, the construction, operation and advantages of the invention will readily be understood.

What I claim is:—

The combination with the horizontal wires and the plants, of the wire wires, each constructed of a single piece of wire doubled to form opposite sides provided at intervals with depending loops to form crotches to receive the horizontal wires and twisted around the latter, and the curved hooks 6 formed integral with the twisted portions and embracing the plants and securing them to the horizontal wire, substantially as described.

In testimony that I claim the foregoing as my own I have hereto affixed my signature in presence of two witnesses.

EDWIN J. GRIFFIN.

Witnesses:
HENRY M. BALL,
J. B. HART.